(12) United States Patent
Liu

(10) Patent No.: US 11,362,567 B2
(45) Date of Patent: *Jun. 14, 2022

(54) ELECTRICAL POWER GENERATION FROM TURBINE ENGINES

(71) Applicant: THE BOEING COMPANY, Chicago, IL (US)

(72) Inventor: Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/744,305

(22) Filed: Jan. 16, 2020

(65) Prior Publication Data

US 2021/0226509 A1 Jul. 22, 2021

(51) Int. Cl.
*H02K 7/18* (2006.01)
*H02P 9/04* (2006.01)
(Continued)

(52) U.S. Cl.
CPC ............ *H02K 7/1823* (2013.01); *B64D 27/16* (2013.01); *B64D 31/00* (2013.01); *B64D 33/02* (2013.01);
(Continued)

(58) Field of Classification Search
CPC ........ B64D 27/16; B64D 31/00; B64D 33/02; B64D 33/04; B64D 41/00; B64D 2221/00;
(Continued)

(56) References Cited

U.S. PATENT DOCUMENTS 3,671,850 A * 6/1972 Mehnert .................. H02P 9/36
322/28
3,768,002 A * 10/1973 Drexler ..................... H02P 9/38
322/25
(Continued)

FOREIGN PATENT DOCUMENTS

| EP | 1712761 | A2 | 10/2006 |
| EP | 2660440 | A2 | 11/2013 |
| GB | 2568093 | A | 5/2019 |

OTHER PUBLICATIONS

Extended European Search Report for Application No. 20217669.9-1201 dated Sep. 6, 2021.

(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

Electrical power generation in turbine engines in provided by a permanent magnet that emits a first magnetic field and is disposed on a first rotor assembly of a turbine engine; an armature winding connected to a second rotor assembly of the turbine engine such that the armature winding is positioned within the first magnetic field; a resonant emitter configured to receive an electrical power input from the armature winding to generate a second magnetic field of at least a predefined frequency when the first rotor assembly rotates relative to the second rotor assembly; and a resonant receiver disposed on an enclosure of the turbine engine, positioned to receive the second magnetic field and convert the second magnetic field into an electrical power output.

20 Claims, 9 Drawing Sheets

(51) Int. Cl.
*B64D 27/16* (2006.01)
*B64D 31/00* (2006.01)
*B64D 33/02* (2006.01)
*B64D 33/04* (2006.01)
*B64D 41/00* (2006.01)
*F02C 6/20* (2006.01)
*H02K 16/02* (2006.01)

(52) U.S. Cl.
CPC ............. *B64D 33/04* (2013.01); *B64D 41/00* (2013.01); *F02C 6/20* (2013.01); *H02K 16/025* (2013.01); *B64D 2033/0273* (2013.01); *B64D 2221/00* (2013.01); *F05D 2220/323* (2013.01); *F05D 2220/768* (2013.01)

(58) Field of Classification Search
CPC ............ B64D 2033/0273; F02C 6/20; F05D 2220/323; F05D 2220/768; H02K 7/1823; H02K 16/025
See application file for complete search history.

(56) References Cited

U.S. PATENT DOCUMENTS

| | | | | |
|---|---|---|---|---|
| 4,093,869 | A * | 6/1978 | Hoffmann | H02K 19/26 290/31 |
| 4,641,066 | A * | 2/1987 | Nagata | H02P 6/20 318/400.11 |
| 4,723,106 | A * | 2/1988 | Gibbs | H02P 9/36 322/26 |
| 4,982,123 | A * | 1/1991 | Raad | F02N 11/04 290/46 |
| 5,097,195 | A * | 3/1992 | Raad | F02N 11/04 290/38 R |
| 5,581,168 | A * | 12/1996 | Rozman | F02N 11/04 290/22 |
| 5,594,322 | A * | 1/1997 | Rozman | F02N 11/04 318/400.12 |
| 5,595,474 | A | 1/1997 | Girard | |
| 6,906,479 | B2 * | 6/2005 | Xu | F02C 7/268 290/8 |
| 7,821,145 | B2 * | 10/2010 | Huang | F02N 11/04 290/31 |
| 9,209,741 | B2 * | 12/2015 | Gao | H02P 31/00 |
| 9,325,229 | B2 * | 4/2016 | Rozman | H02K 19/365 |
| 10,934,880 | B1 | 3/2021 | Liu | |
| 2004/0057257 | A1 * | 3/2004 | Sarlioglu | F02C 7/268 363/49 |
| 2004/0070373 | A1 * | 4/2004 | Nelson | F02N 11/04 322/28 |
| 2004/0108726 | A1 * | 6/2004 | Sarlioglu | F02N 11/0859 290/38 R |
| 2005/0029887 | A1 | 2/2005 | Fecera | |
| 2008/0136189 | A1 | 6/2008 | Qu et al. | |
| 2008/0303280 | A1 * | 12/2008 | Xu | H02P 9/302 290/31 |
| 2010/0308582 | A1 * | 12/2010 | Rozman | H02P 25/024 290/31 |
| 2012/0153904 | A1 * | 6/2012 | Albsmeier | H02P 9/302 322/28 |
| 2012/0286516 | A1 | 11/2012 | Chong | |
| 2014/0328668 | A1 | 11/2014 | Anthony | |
| 2015/0097372 | A1 * | 4/2015 | Patel | H02P 1/16 290/31 |
| 2015/0108760 | A1 | 4/2015 | De Wergifosse et al. | |
| 2015/0244303 | A1 * | 8/2015 | Gao | H02P 31/00 290/32 |
| 2015/0333600 | A1 * | 11/2015 | Nakano | H02K 11/33 310/71 |
| 2017/0008385 | A1 * | 1/2017 | Fujimoto | B60K 7/0007 |
| 2017/0297728 | A1 | 10/2017 | Niergarth et al. | |
| 2018/0354631 | A1 | 12/2018 | Adibhatla | |
| 2019/0136768 | A1 | 5/2019 | Harvey | |
| 2019/0165708 | A1 | 5/2019 | Smith | |
| 2019/0181689 | A1 | 6/2019 | Oyama et al. | |
| 2020/0240331 | A1 | 7/2020 | Kupratis | |
| 2020/0309027 | A1 | 10/2020 | Rytkonen | |

OTHER PUBLICATIONS

Extended European Search Report for Application Numnber 20182212.9-1007 dated Dec. 16, 2020.

* cited by examiner

ELECTRICAL POWER GENERATION FROM TURBINE ENGINES

FIELD

Aspects of the present disclosure generally relate to electrical energy generation from turbine engines. More particularly, the present disclosure relates to converting the mechanical energy from turbine engines, as may be used in aircraft and other vehicles, into electrical energy and transferring that energy to the associated vehicle via electromagnetic fields.

BACKGROUND

Various vehicles use various combinations of engines to provide motive thrust and maneuvering control to those vehicles. For example, aircraft may use engines that incorporate a turbine to power a jet or a propeller. Turbine engines include several rotating components to provide motive thrust and air/gas compression. Electrical generators connected to the rotating components of the turbine engine can extract and convert the mechanical rotational energy into electrical energy that is used to power various onboard systems for the associated vehicle. Due to the wear on the individual parts of an engine caused by the operating temperatures, speeds of rotation, and airflow within the engine, physical components used to extract rotational energy from the rotating engine components may be subject to high replacement rates to avoid introducing reliability issues to other engine components. Additionally, due to the location of the energy extracting components in the turbine engines, repair and replacement may be difficult or time consuming to accomplish.

SUMMARY

The present disclosure provides a system in one aspect, that includes a permanent magnet that emits a first magnetic field and is disposed on a first rotor assembly of a turbine engine; an armature winding connected to a second rotor assembly of the turbine engine such that the armature winding is positioned within the first magnetic field; a resonant emitter configured to receive an electrical power input from the armature winding to generate a second magnetic field of at least a predefined frequency when the first rotor assembly rotates relative to the second rotor assembly; and a resonant receiver disposed on an enclosure of the turbine engine, positioned to receive the second magnetic field and convert the second magnetic field into an electrical power output.

In various aspects, in combination with any system described above or below, the first rotor assembly is a higher-pressure rotor, the second rotor assembly is a lower-pressure rotor, and the higher-pressure rotor rotates at a first speed that is greater than a second speed at which the lower-pressure rotor rotates.

In various aspects, in combination with any system described above or below, the first rotor assembly is a lower-pressure rotor, the second rotor assembly is a higher-pressure rotor, and the higher-pressure rotor rotates at a first speed that is greater than a second speed at which the lower-pressure rotor rotates.

In various aspects, in combination with any system described above or below, the first magnetic field propagates radially outward from an axis of rotation for the first rotor assembly over an air gap defined between the permanent magnet and armature winding.

In various aspects, in combination with any system described above or below, the first magnetic field propagates coaxially to an axis of rotation for the first rotor assembly over an air gap defined between the permanent magnet and armature winding.

In various aspects, in combination with any system described above or below, the system further includes a high frequency converter disposed between the armature winding and the resonant emitter; and wherein the high frequency converter is configured to provide the electrical power input at a higher frequency to the resonant emitter than the first magnetic field is received by the armature winding.

In various aspects, in combination with any system described above or below, the higher frequency is greater than a difference in rotational speed between the first rotor assembly and the second rotor assembly and is based on a power transfer efficiency between the resonant emitter and the resonant receiver.

In various aspects, in combination with any system described above or below, the electrical power output includes a plurality of electrical phases based on a number of phases defined in the armature winding.

In various aspects, in combination with any system described above or below, the system further includes a power control unit disposed in the enclosure and connected to a power distribution bus for a vehicle.

The present disclosure provides a turbine engine in one aspect, that includes an enclosure, comprising: an air intake at an upstream end; a compression section downstream of the air intake; a combustion section downstream of the compression section; a turbine section downstream of the combustion section; and an exhaust at a downstream end; a first shaft coupled with a first compressor of the compression section and with a first turbine of the turbine section, wherein the first shaft is configured to rotate at a first rotational speed; a second shaft coupled with a second compressor of the compression section and with a second turbine of the turbine section and running coaxially with the first shaft, wherein the second shaft is configured to rotate at a second rotational speed; an armature winding connected to a first one of the first compressor and the second compressor; a permanent magnet connected to a second one of the first compressor and the second compressor, configured to: emit a first magnetic field; rotate relative to the armature winding at a differential rotational speed corresponding to a difference between the first rotational speed and the second rotational speed; and induce a current in the armature winding; a resonant emitter connected to the armature winding and configured to generate a second magnetic field of at least a predefined frequency when powered by the current; and a resonant receiver disposed on the enclosure of the turbine engine, positioned to receive the second magnetic field, and configured to convert the second magnetic field into an electrical power output.

In various aspects, in combination with any turbine engine described above or below, the turbine engine further includes: a third shaft coupled with a third compressor of the compression section downstream of the first compressor and the second compressor and with a third turbine of the turbine section upstream of the first turbine and the second turbine, wherein the third shaft extends coaxially to the second shaft and is configured to rotate at a third rotational speed that is greater than the first rotational speed and the second rotational speed.

In various aspects, in combination with any turbine engine described above or below, the turbine engine further includes: a secondary armature winding, connected to a first one of the third compressor and the second compressor; a secondary permanent magnet, connected to a second one of the third compressor and the second compressor configured to: emit a secondary first magnetic field; rotate relative to the secondary armature winding at a secondary differential rotational speed corresponding to a secondary difference between the third rotational speed and the second rotational speed; and induce a secondary current in the secondary armature winding; a secondary resonant emitter connected to the secondary armature winding and configured to generate a secondary second magnetic field of at least a secondary predefined frequency when powered by the secondary current; and a secondary resonant receiver disposed on the enclosure of the turbine engine, positioned to receive the secondary second magnetic field, and configured to convert the secondary second magnetic field into a secondary electrical power output.

In various aspects, in combination with any turbine engine described above or below, the turbine engine further includes: a third shaft coupled with a third compressor of the compression section upstream of the first compressor and the second compressor and with a third turbine of the turbine section downstream of the first turbine and the second turbine; and wherein the third shaft extends coaxially to the second shaft, and is configured to rotate at a third rotational speed that is less than the first rotational speed and the second rotational speed.

In various aspects, in combination with any turbine engine described above or below, the turbine engine further includes: a secondary armature winding, connected to a first one of the third compressor and the first compressor; a secondary permanent magnet, connected to a second one of the third compressor and the first compressor, configured to: emit a secondary first magnetic field; rotate relative to the secondary armature winding at a secondary differential rotational speed corresponding to a secondary difference between the third rotational speed and the first rotational speed; and induce a secondary current in the secondary armature winding; a secondary resonant emitter connected to the secondary armature winding and configured to generate a secondary second magnetic field of at least a secondary predefined frequency when powered by the secondary current; and a secondary resonant receiver disposed on the enclosure of the turbine engine, positioned to receive the secondary second magnetic field, and configured to convert the secondary second magnetic field into a secondary electrical power output.

In various aspects, in combination with any turbine engine described above or below, the turbine engine further includes: a nacelle, defining a bypass flow chamber in which the enclosure is disposed; and a transfer cable, disposed in the bypass flow chamber running from the enclosure to electrically connect the resonant receiver to a power distribution bus for a vehicle.

In various aspects, in combination with any turbine engine described above or below, the turbine engine further includes a power control unit disposed within the bypass flow chamber externally to the enclosure and electrically connected between the resonant receiver and the transfer cable.

In various aspects, in combination with any turbine engine described above or below, the armature winding and the permanent magnet are separated by an air gap defined coaxially to the first shaft.

In various aspects, in combination with any turbine engine described above or below, the armature winding and the permanent magnet are separated by an air gap defined in a plane intersecting an axis of rotation of the first shaft.

The present disclosure provides a method in one aspect, that includes: rotating a permanent magnet, emitting a first magnetic field and attached to a first rotor assembly of a turbine engine, about a first shaft of the turbine engine to induce a multiphase alternating current in an armature winding disposed on a second rotor assembly attached to a second compressor of the turbine engine connected to a second shaft coaxial with the first shaft; powering, via the multiphase alternating current, a resonant emitter to generate a second magnetic field at or above a predefined frequency; and converting the second magnetic field via a resonant receiver disposed on an interior surface of an enclosure of the turbine engine into an electrical power output.

The present disclosure provides a method in one aspect, that includes: affixing a permanent magnet to a first rotor assembly connected to a first compressor shaft of a turbine engine; affixing a second rotor assembly, including an armature winding and a resonant emitter, to a second compressor shaft of the turbine engine, wherein the armature winding is positioned within a first magnetic field emitted by the permanent magnet; and affixing a resonant receiver to an interior surface of an enclosure of the turbine engine in relation to the resonant emitter to receive a second magnetic field when the resonant emitter radiates the second magnetic field.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

As will be appreciated, the Figures are provided to illustrate the concepts discussed in the present disclosure, and may include various components that are simplified or not drawn to scale relative to other components to better highlight and teach the inventive concepts described herein.

DETAILED DESCRIPTION

The present disclosure provides for power extraction and transfer from the rotational components of a turbine engine via electromagnetic (EM) components that are not in physical contact with one another, but rather extract and convert rotational energy into electrical energy via a series of induced magnetic fields. In some aspects, a permanent magnet affixed to a first rotor assembly in the engine rotates relative to a first armature winding on a second rotor assembly in the engine to induce an electrical current in the first armature when the two compressors rotate relative to one another while the engine is in operation. This induced current, in turn, powers a high frequency resonator that produces a second magnetic field with a high frequency to induce a current in receiving circuits located in fixed positions on the case or shell of the engine to thereby wirelessly transfer power to the electrical systems of the vehicle.

The electromagnetic power transfer components are arranged with radial symmetry around the engine with contact to a single thrust generating component (e.g., a rotor assembly or an enclosure). Air gaps separate the permanent magnet and the armature winding and the resonant emitter and the resonant receiver. Because none of the electromagnetic power transfer components are in physical contact with more than one thrust generating component of the engine or another power transfer component connected to a different thrust generating component, the system beneficially experiences less wear and correspondingly lower replacement rates of the power transfer components. Additionally, the electromagnetic components do not transfer power via wires or shafts disposed in the airflow of the turbine engine, and may be relatively lightweight compared to gearboxes and shafts that translate rotational energy to an external generator, thus providing greater mechanical and fuel efficiency for the engine. Moreover, the efficiency of power extraction and transfer via the electromagnetic power transfer components can exceed the efficiency of mechanical power transfer components, thus further improving the efficiency of the engine.

Although the examples provided in the present disclosure primarily illustrate the use the power transfer system in the turbine engines of aircraft, the power transfer system described in the present disclosure may be used in conjunction with turbine engines used in cars, busses, trains, boats, and various other vehicles.

Figure 1A:
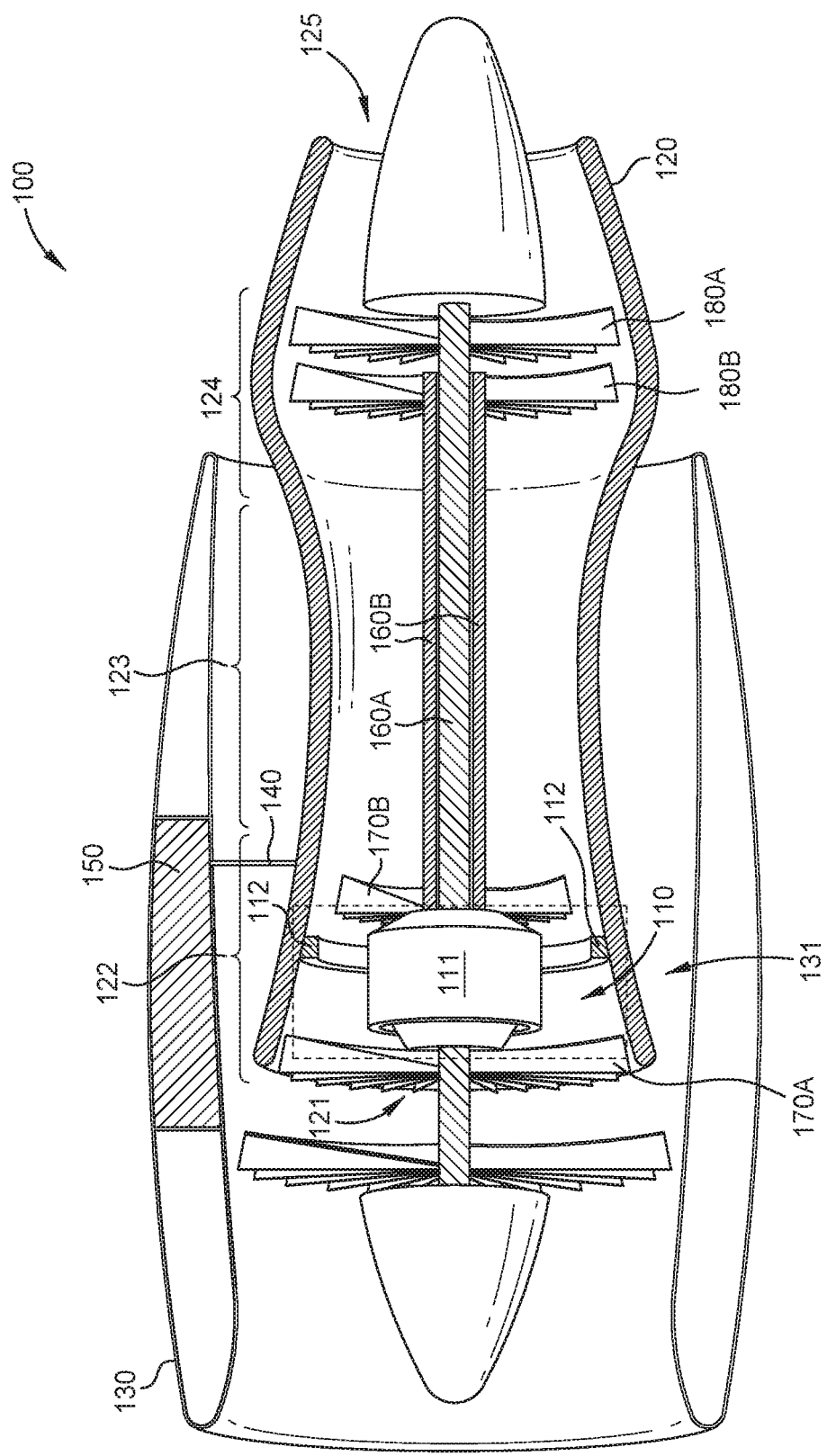
FIGS. 1A and 1B illustrate cross-sectioned turbine engines including one or more electrical generators, according to aspects of the present disclosure.
Figure 1B:
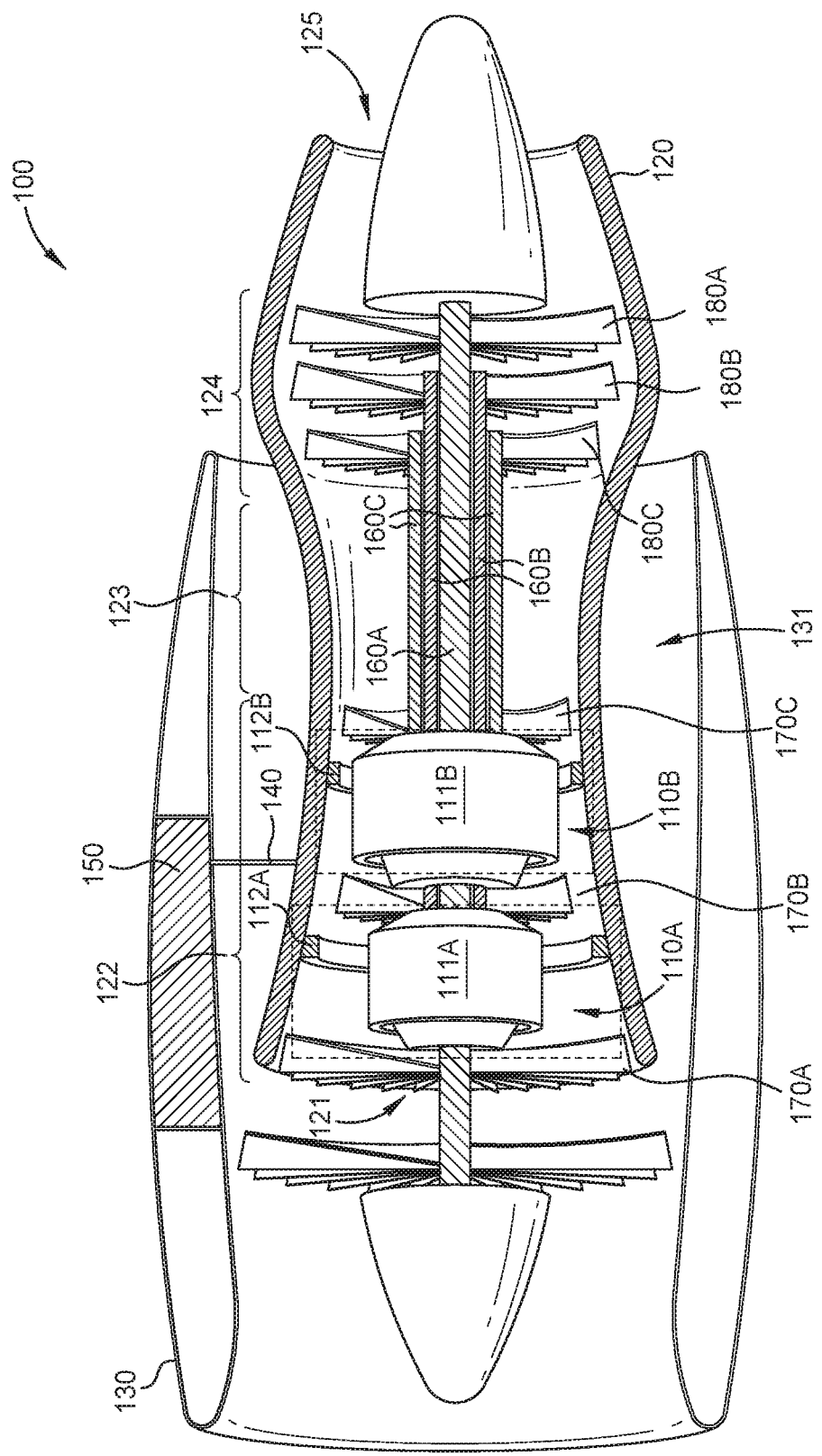

FIGS. 1A and 1B illustrate cross-sectional views of turbine engines 100, (individually, turbine engine 100A and turbine engine 100B) which include one or more electrical generators 110. The turbine engines 100 include an enclosure 120 defining an air intake 121 at an upstream end, a compression section 122 downstream of the air intake 121, a combustion section 123 downstream of the compression section 122, a turbine section 124 downstream of the combustion section 123, and an exhaust 125 at a downstream end. In various aspects, the enclosure 120 is included inside of a nacelle 130 (also referred to as a housing), and a bypass flow chamber 131 is defined between an outer surface of the enclosure 120 and an inner surface of the nacelle 130. A transfer cable 140 linking the electrical generators 110 to a power distribution bus 150 or other power transfer mechanism for a vehicle (e.g., a cable connector, spliter, or a protective device such as circuit breaker, or bus tie) in which the turbine engine 100 is disposed in the bypass flow chamber 131 running from the enclosure 120 to electrically connect electrical distributors 112 with a power distribution bus (e.g., for a vehicle).

The turbine engine 100A of FIG. 1A includes a first spool shaft 160A (generally, spool shaft or shaft 160 or collectively, shaft assembly) and a second spool shaft 160B, while the turbine engine 100B of FIG. 1B includes a first spool shaft 160A, a second spool shaft 160B, and a third spool shaft 160C. Each shaft 160 extends coaxially with the other shafts 160, and rotates during operation at different rates relative to one another due to the ejection of high pressure exhaust rotating the turbines 180A-B (generally, turbine 180), which in turn drive the associated compressors 170A-B or 170A-C (generally, compressor 170) at different rates via the associated spool shafts 160. For example, a first spool shaft 160A rotates (due to forces imparted by the first turbine 180A) to drive the rotation of a first compressor 170A at a first rotational speed, while a second spool shaft 160B rotates (due to forces imparted by the second turbine 180B) to drive the rotation of a second compressor 170B at a second rotational speed. Similarly, in FIG. 1B, the third turbine 180C rotates a third spool shaft 160C to drive the rotation of a third compressor 170C at a third rotational speed, where the first, second, and third rotational speeds are all different from one another.

The compressors 170 are disposed in the compression section 122 of the enclosure 120, and may each include several fan blades arranged in one or more rows. The turbines 180 are disposed in the turbine section 124 of the enclosure 120, and may each include several fan blades arranged in one or more rows. Although not illustrated, various bearings or low friction surfaces may be located between the shafts 160 to improve rotational characteristics of the shafts 160 (e.g., to reduce friction).

As illustrated in FIG. 1A, the first spool shaft 160A is a low-pressure shaft relative to the high-pressure shaft of the second spool shaft 160B. Accordingly, the first compressor 170A is located upstream of the second compressor 170B, and rotates at a lower rotational speed than the second compressor 170B during operation of the turbine engine 100. Similarly, the first turbine 180A is located downstream of the second turbine 180B, and rotates at a lower rotational speed than the second turbine 180B during operation of the turbine engine 100.

As illustrated in FIG. 1B, the first spool shaft 160A is a low-pressure shaft, the second spool shaft 160B is a medium-pressure shaft, and the third spool shaft 160C is a high-pressure shaft relative to one another. Accordingly, the first compressor 170A is located upstream of the second compressor 170B, which is located upstream of the third compressor 170C, each of which operates at lower rotational speeds than downstream compressors 170 during operation of the turbine engine 100. Similarly, the first turbine 180A is located downstream of the second turbine 180B, which is located downstream of the third turbine 180C, each of which operates at progressively lower rotational speeds than upstream turbines 180 during operation of the turbine engine 100.

Accordingly, a first differential rotational speed exists between the first spool shaft 160A and the second spool shaft 160B (and any components attached thereto) during operation, and, in FIG. 1B, a second differential rotational speed (which may be the same as or different than the first differential rotational speed) exists between the second spool shaft 160B and the third spool shaft 160C (and any components attached thereto).

The electrical generators 110 include electrical extractors 111 affixed to the compressors 170 and electrical distributors 112 affixed to the enclosure 120. The electrical extractors 111 are not physically connected to the electrical distributors 112, but are separated by an empty space (e.g., an "air gap") and electromagnetically linked during operation by a generated electromagnetic field. The electrical extractors 111 are connected to the compressors 170 and capitalize on the different rotational speeds of the compressors 170 attached to different shafts 160 to rotate the components relative to one another using the operational rotation of the components of the turbine engine 100. As illustrated in FIG. 1A, an electrical extractor 111 is located at the interface between the first compressor 170A and the second compressor 170B. As illustrated in FIG. 1B, a first electrical extractor 111A is located at the interface between the first compressor 170A and the second compressor 170B, and a second electrical extractor 111B is located at the interface between the second compressor 170B and the third compressor 170C.

Each electrical extractor 111 is associated with a corresponding electrical distributor 112 affixed radially around a corresponding portion of the enclosure 120 (e.g., a first electrical extractor 111A corresponding to a first electrical distributor 112A, a second electrical extractor 111B corresponding to a second electrical distributor 112B). The electrical distributor 112 includes a resonant receiver for receiving high frequency power from the electrical extractor 111 and a power conversion unit (PCU) to convert the high frequency power to a predefined frequency (e.g., 400 Hz) for consumption and/or storage in the vehicle, and is connected to the power distribution bus 150 via the cable 140. Although not illustrated, in some aspects using a three-shaft design, the turbine engine 100 may include only one electrical generator 110; omitting one of the first electrical generator 110A or the second electrical generator 110B. Additionally, although one arrangement of the components of the electrical generators 110 is shown in FIGS. 1A and 1B, the components may be arranged in various configurations, such as those discussed in relation to FIGS. 2A-2B and 3A-3B.

Figure 2A:
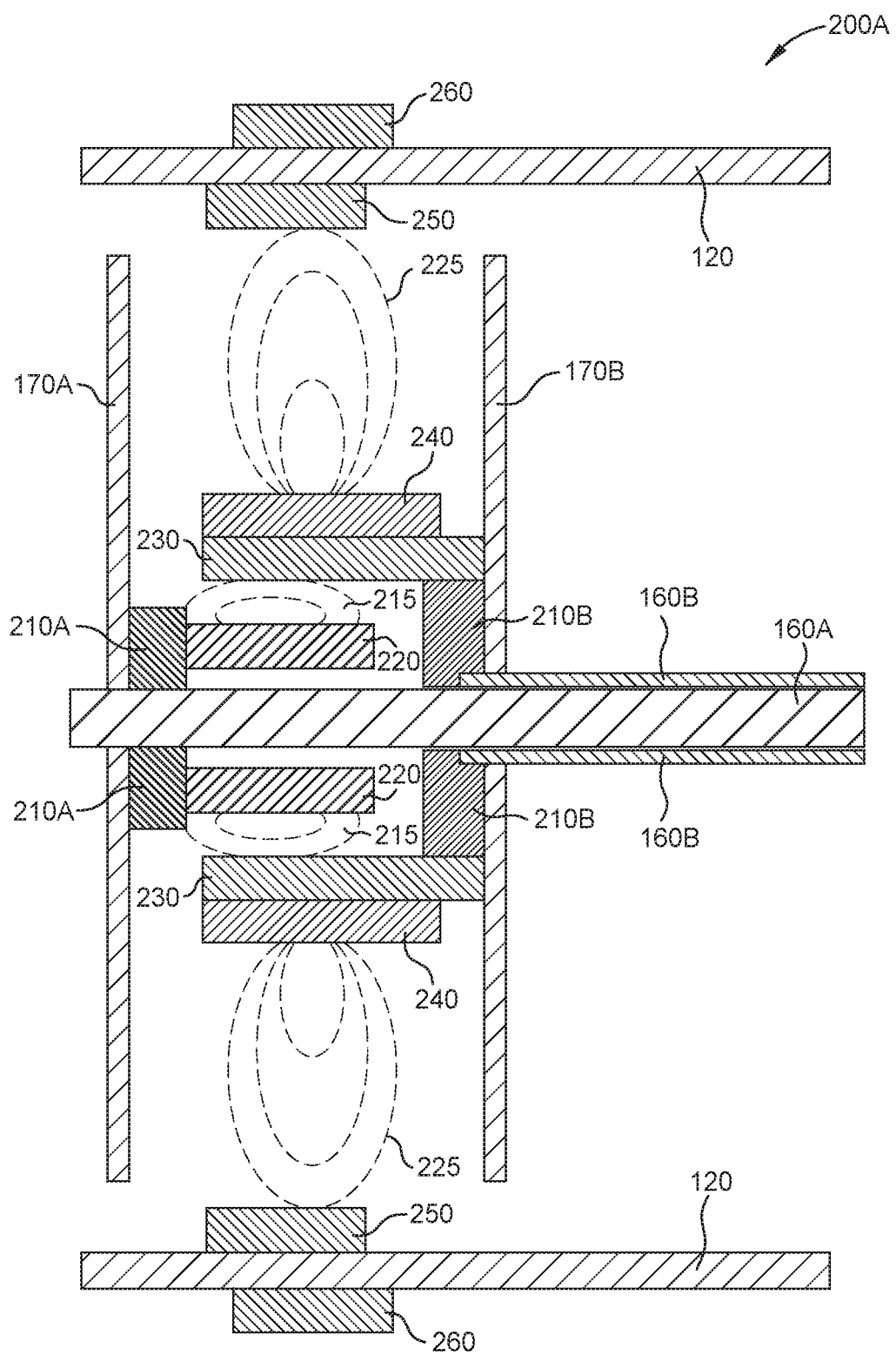
FIGS. 2A-2D illustrate cross-sectional views of the components of an electrical extractor and magnetic fields generated therein, according to aspects of the present disclosure.
Figure 2B:
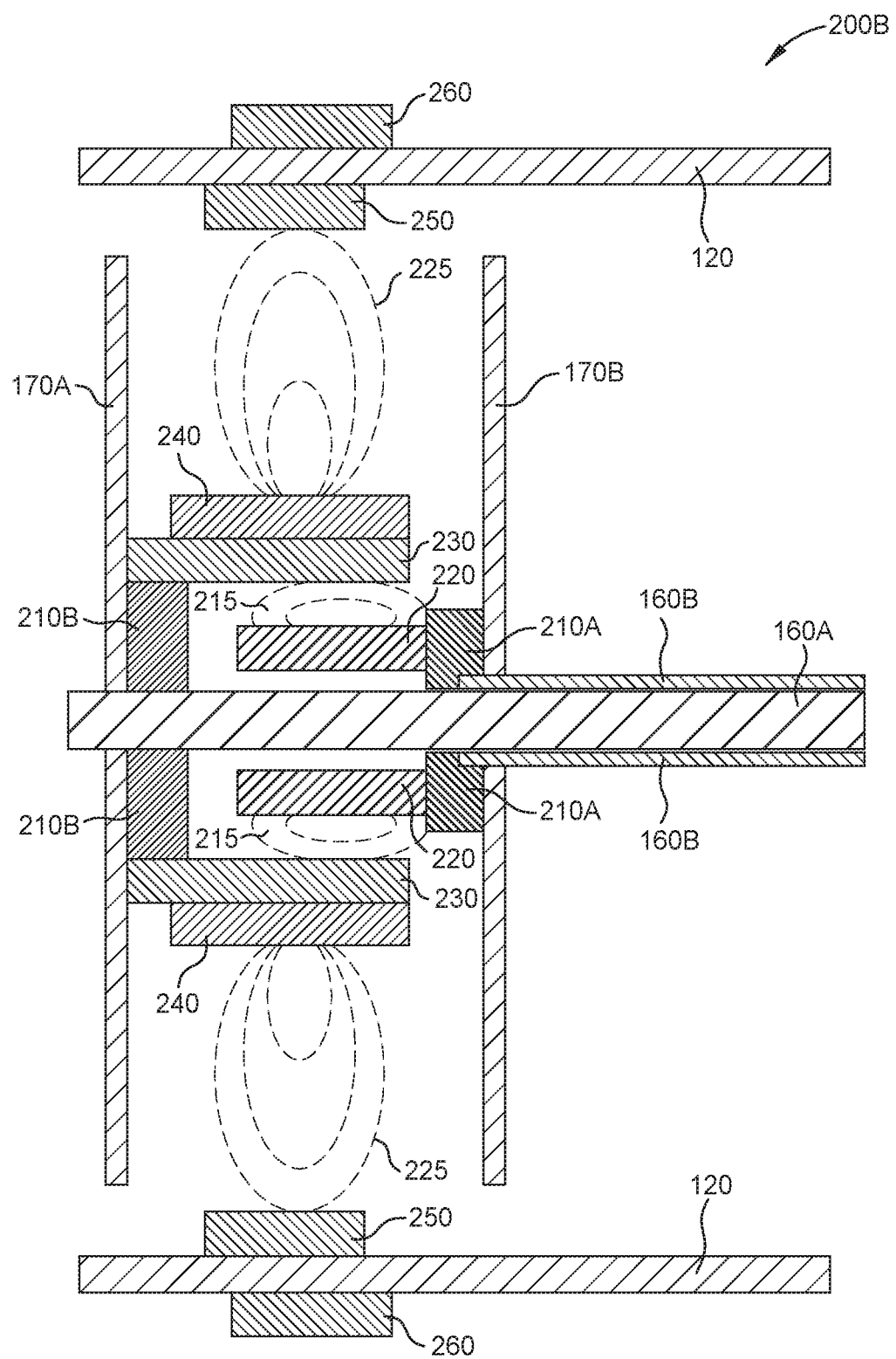
Figure 2C:
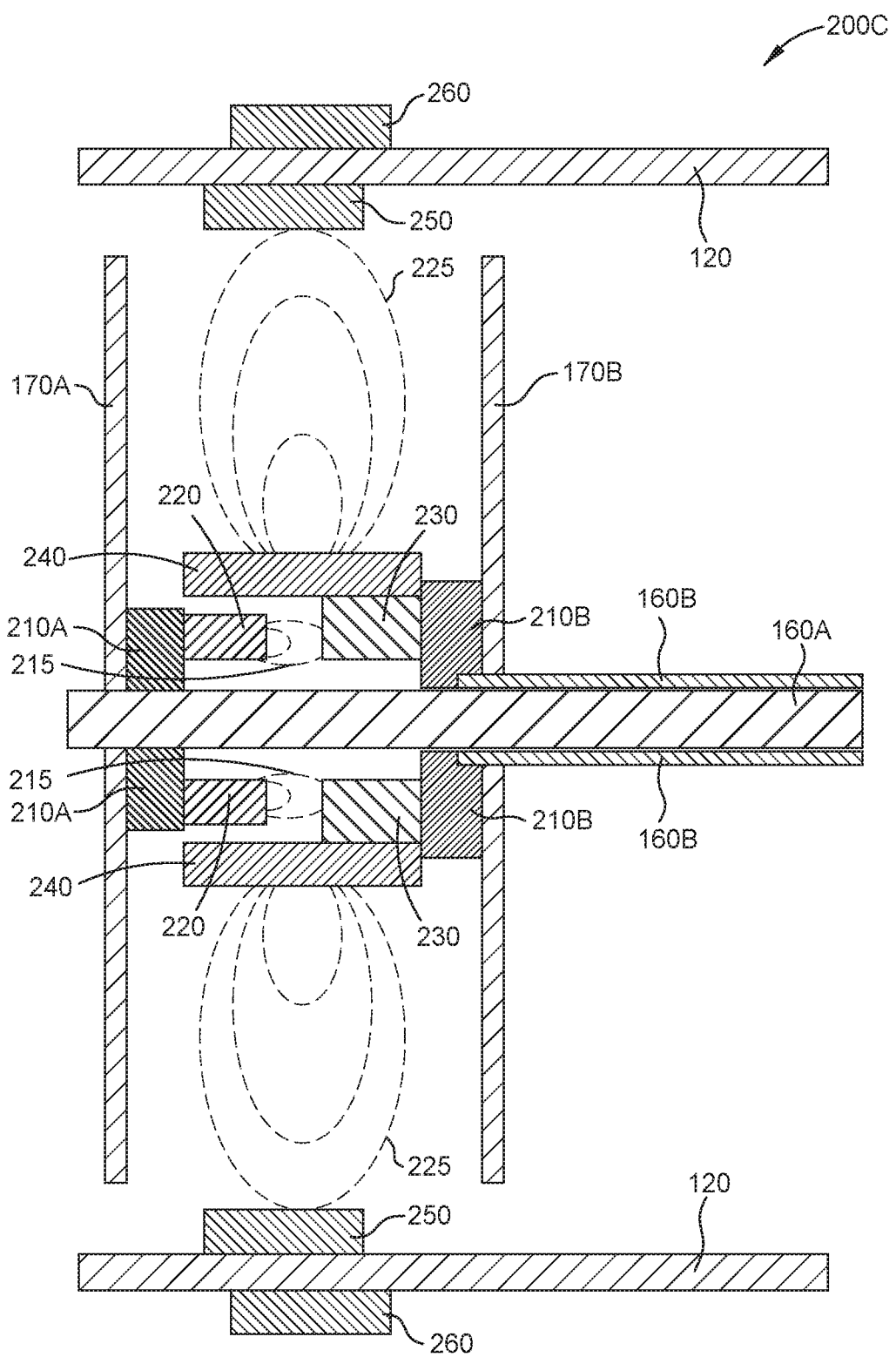
Figure 2D:
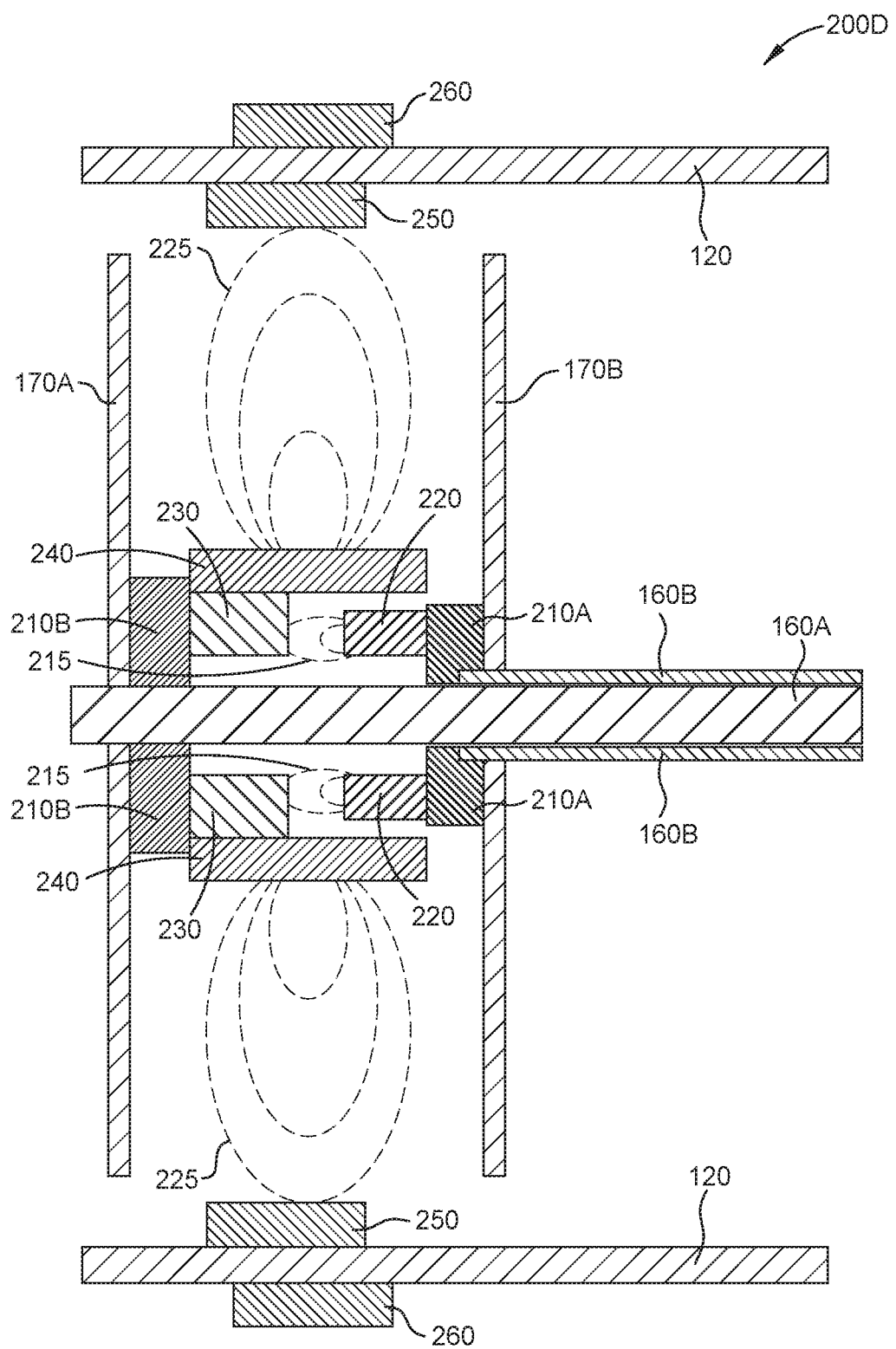

FIGS. 2A-2D illustrate cross-sectional views of the components of an electrical generator 110. FIGS. 2A and 2B illustrate the components arranged with a radial magnetic linkage, and FIGS. 2C and 2D illustrate the components arranged with an axial magnetic linkage. As will be appreciated, as cross-sectional views, FIGS. 2A-2D illustrate one segment of a radially arranged electrical generators 110, and an electrical generator 110 may be constructed as illustrated in one of FIGS. 2A-2D or more than one of FIGS. 2A-2D at different arc segments in the radial arrangement around the shafts 160/within the enclosure 120 of the turbine engine 100.

The electrical extractors 111 are located at the interface of two compressors 170A and 170B. For example, the illustrated electrical extractors 111 may be located on the first compressor 170A and the second compressor 170B. In another example, the illustrated electrical extractors 111 may be located on the second compressor 170B and the third compressor 170C. In various aspects, the components illustrated in FIG. 2A-2D may belong to a sole electrical extractor 111 (as in FIG. 1A), or to one of a primary or secondary electrical extractor 111 (as in FIG. 1B). In aspects including multiple electrical extractors 111, the individual components may be arranged both according to the same one of FIGS. 2A-2D or one according to a first one of FIGS. 2A-2D and the other one according to a different one of FIGS. 2A-2D. As used herein, when differentiating components between multiple electrical generators 110, the components of one electrical generator 110 may be distinguished by referring to those components as "secondary" components. For example, a first electrical extractor 111A includes a primary permanent magnet 220, and a second electrical extractor 111B includes a secondary permanent magnet 220. In another example, a first electrical extractor 111A is attached to a primary first compressor 170A and a primary second compressor 170B, and a second electrical extractor 111B is attached to a secondary first compressor 170A (which may be a different end of the same compressor 170 as the primary first compressor 170A or the primary second compressor 170B) and a secondary second compressor 170B (which may be a different end of the same shaft 170 as the primary first compressor 170A or the primary second compressor 170B).

FIG. 2A illustrates a first component arrangement 200A for an electrical extractor 111, according to aspects of the present disclosure. A first rotor assembly 210A (generally, rotor assembly 210) is connected to a lower-pressure first compressor 170A and a second rotor assembly 210B is connected to a higher-pressure second compressor 170B at an interface between the two compressors 170. In various aspects, the rotor assemblies 210 are connected to one or more blades of the associated compressor 170, to a ring/connection point of the blades to an associated spool shaft 160, or to the associated spool shaft 160. The rotor assemblies 210 position various electromagnetic components of the electrical extractor 111 at known distances and orientations relative to one another, the shafts 160, the compressors 170, and the electrical distributor 112.

In FIG. 2A, the first rotor assembly 210A includes a permanent magnet 220, which produces a first magnetic field 215. The permanent magnet 220 emits the first magnetic field 215 radially through an air gap defined coaxially to the shafts 160 to magnetically link the permanent magnet 220 with an armature winding 230 included in the second rotor assembly 210B. In various aspects, the permanent magnet 220 may include a plurality of magnets arranged circumferentially around the shafts 160 to emit a plurality of first magnetic fields 215.

The second rotor assembly 210B includes the armature winding 230 and a resonant emitter 240. The armature winding 230 is arranged concentrically and radially around, but not in physical contact with, the permanent magnet 220 or the shafts 160, and positions the armature winding 230 within a predefined field strength of the first magnetic field 215. Accordingly, the first magnetic field 215 radially links the permanent magnet 220 and the armature winding 230. In various aspects, when rotated relative to the permanent magnet 220, the armature winding 230 produces a first current ($I_1$) as a multiphase alternating current, which is input to power the resonant emitter 240 to generate a second magnetic field 225. The second rotor assembly 210B positions the resonant emitter 240 outside of a predefined field strength of the first magnetic field 215, and accordingly, the permanent magnet 220 is positioned outside of a predefined field strength of the second magnetic field 225. The second magnetic field 225 is radially emitted outward from the resonant emitter 240 to electromagnetically link the resonant emitter 240 with a resonant receiver 250.

FIG. 2B illustrates a second component arrangement 200B for an electrical extractor 111, according to aspects of the present disclosure. A first rotor assembly 210A is connected to a higher-pressure second compressor 170B and a second rotor assembly 210B is connected to a lower-pressure second compressor 170A at an interface between the two compressors 170. In various aspects, the rotor assemblies 210 are connected to one or more blades of the associated compressor 170, to a ring/connection point of the blades to an associated spool shaft 160, or to the associated spool shaft 160. The rotor assemblies 210 position various electromagnetic components of the electrical extractor 111 at known distances and orientations relative to one another, the shafts 160, the compressors 170, and the electrical distributor 112.

In FIG. 2B, the first rotor assembly 210A includes a permanent magnet 220, which produces a first magnetic field 215. The permanent magnet 220 emits the first magnetic field 215 radially through an air gap defined coaxially to the shafts 160 to magnetically link the permanent magnet 220 with an armature winding 230 included in the second rotor assembly 210B. In various aspects, the permanent magnet 220 may include a plurality of magnets arranged circumferentially around the shaft 160 to emit a plurality of first magnetic fields 215.

The second rotor assembly 210B includes the armature winding 230 and a resonant emitter 240. The armature winding 230 is arranged concentrically and radially, but not in physical contact with, the permanent magnet 220 or the shafts 160, and positions the armature winding 230 within a predefined field strength of the first magnetic field 215. Accordingly, the first magnetic field 215 radially links the permanent magnet 220 and the armature winding 230. In various aspects, when rotated relative to the permanent magnet 220, the armature winding 230 produces a first current ($I_1$) as a multiphase alternating current, which powers the resonant emitter 240 to generate a second magnetic field 225. The second rotor assembly 210B positions the resonant emitter 240 outside of a predefined field strength of the first magnetic field 215, and accordingly, the permanent magnet 220 is positioned outside of a predefined field strength of the second magnetic field 225. The second magnetic field 225 radially links the resonant emitter 240 with a resonant receiver 250.

FIG. 2C illustrates a third component arrangement 200C for an electrical extractor 111, according to aspects of the present disclosure. A first rotor assembly 210A is connected to a lower-pressure first compressor 170A and a second rotor assembly 210B is connected to a higher-pressure second compressor 170B at an interface between the two compressors 170. In various aspects, the rotor assemblies 210 are connected to one or more blades of the associated compressor 170, to a ring/connection point of the blades to an associated spool shaft 160, or to the associate shaft 160. The rotor assemblies 210 position various electromagnetic components of the electrical extractor 111 at known distances and orientations relative to one another, the shafts 160, the compressors 170, and the electrical distributor 112.

In FIG. 2C, the first rotor assembly 210A includes a permanent magnet 220, which produces a first magnetic field 215. The permanent magnet 220 emits the first magnetic field 215 through an air gap defined in a plane intersecting the axis of rotation for the shafts 160 to magnetically link the permanent magnet 220 with an armature winding 230 included in the second rotor assembly 210B. Although illustrated as defining an air gap in a plane orthogonal to the axis of rotation (e.g., for a coaxial magnetic linkage between the permanent magnet 220 and the armature winding 230), in other aspects, the air gap may be defined at other angles relative to the shafts 160. In various aspects, the permanent magnet 220 may include a plurality of magnets arranged radially around the shaft 160 to emit a plurality of first magnetic fields 215.

The second rotor assembly 210B includes the armature winding 230 and a resonant emitter 240. The armature winding 230 is arranged radially around, but not in physical contact with, the shafts 160 and arranged planetary to the permanent magnet 220. As used herein, when two objects are described as being "planetary" with one another, it will be understood that the objects rotate about a shared axis of rotation (at the same or different radial distances from the axis of rotation), but at different points along the length of the axis of rotation so as to be clear of the orbit (i.e., not physically contact) of the other object. The relative positions and lengths of the rotor assemblies 210 position the armature winding 230 within a predefined field strength of the first magnetic field 215. Accordingly, the first magnetic field 215 axially links the permanent magnet 220 and the armature winding 230. In various aspects, when rotated relative to the permanent magnet 220, the armature winding 230 produces a first current ($I_1$) as a multiphase alternating current, which powers the resonant emitter 240 to generate a second magnetic field 225. The second rotor assembly 210B positions the resonant emitter 240 outside of a predefined field strength of the first magnetic field 215, and accordingly, the permanent magnet 220 is positioned outside of a predefined field strength of the second magnetic field 225. The second magnetic field 225 radially links the resonant emitter 240 with a resonant receiver 250.

FIG. 2D illustrates a fourth component arrangement 200D for an electrical extractor 111, according to aspects of the present disclosure. A first rotor assembly 210A is connected to a higher-pressure first compressor 170A and a second rotor assembly 210B is connected to a lower-pressure second compressor 170B at an interface between the two compressors 170. In various aspects, the rotor assemblies 210 are connected to one or more blades of the associated compressor 170, to a ring/connection point of the blades to an associated spool shaft 160, or to the associated spool shaft 160. The rotor assemblies 210 position various electromagnetic components of the electrical extractor 111 at known distances and orientations relative to one another, the shafts 160, the compressors 170, and the electrical distributor 112.

In FIG. 2D, the first rotor assembly 210A includes a permanent magnet 220, which produces a first magnetic field 215. The permanent magnet 220 emits the first magnetic field 215 through an air gap defined in a plane intersecting the axis of rotation for the shafts 160 to magnetically link the permanent magnet 220 with an armature winding 230 included in the second rotor assembly 210B. Although illustrated as defining an air gap in a plane orthogonal to the axis of rotation (e.g., for a coaxial magnetic linkage between the permanent magnet 220 and the armature winding 230), in other aspects, the air gap may be defined at other angles relative to the shafts 160. In various aspects, the permanent magnet 220 may include a plurality of magnets arranged radially around the shaft 160 to emit a plurality of first magnetic fields 215.

The second rotor assembly 210B includes the armature winding 230 and a resonant emitter 240. The armature winding 230 is arranged radially around, but not in physical contact with, the shafts 160 and arranged planetary to the permanent magnet 220. The relative positions and lengths of the rotor assemblies 210 position the armature winding 230 within a predefined field strength of the first magnetic field 215. Accordingly, the first magnetic field 215 axially links the permanent magnet 220 and the armature winding 230. In various aspects, when rotated relative to the permanent magnet 220, the armature winding 230 produces a first current ($I_1$) as a multiphase alternating current, which powers the resonant emitter 240 to generate a second magnetic field 225. The second rotor assembly 210B positions the resonant emitter 240 outside of a predefined field strength of the first magnetic field 215, and accordingly, the permanent magnet 220 is positioned outside of a predefined field strength of the second magnetic field 225. The second magnetic field 225 radially links the resonant emitter 240 with a resonant receiver 250.

In each of FIGS. 2A-2D, a resonant receiver 250 of an electrical distributor 112 is affixed to an interior surface of the enclosure 120, and is positioned in relation to the resonant emitter 240 to receive at least a predefined field strength of the second magnetic field 225. The resonant receiver 250 is arranged with radial symmetry around the enclosure 120, and is configured to receive the second magnetic field 225 to produce a third multiphase alternating current ($I_3$) that is provided to a power control unit 260 (also referred to as a PCU) that conditions the power for provision to a bus or other electrical distribution system of a vehicle.

During operation of the turbine engine 100 in which the components are disposed, the rotational forces imparted by turbines cause the compressors 170 and attached EM components to rotate relative to one another and the stationary enclosure 120. Due to the differential in the rotational speeds of the higher-pressure compressor 170 and the lower-pressure compressor 170, the first magnetic field 215 rotates relative to the armature winding 230, and the second magnetic field 225 rotates relative to the (nominally stationary) resonant receiver 250. Accordingly, electrical energy is extracted from the rotational forces of the shafts 160 and is wirelessly transferred between the various assemblies via magnetic fields instead of via mechanical transfer components, such as gears or the like.

The relative sizes and positions of the electromagnetically coupled components in FIGS. 2A-2D have been illustrated for the easy identification and differentiation of the reader. However, in various aspects, a fabricator may alter the relative sizes, shapes, and orientations of these components based on the physical properties of the turbine engine 100 in which the components are installed (e.g., length, thickness, circumference, gap distance, rotational torque, and speed, operating temperature), the desired power characteristics for the extracted power (e.g., number of power phases, voltage/current levels), and the like. The lengths of the components along the axis of the shafts 160 are determined by the torque and/or power rating requirements of the vehicle from the turbine engine 100, and the relative sizes and distances of individual components are sized to optimize torque production and speed from the turbine engine 100 and power transfer efficiency in the electrical generator 110 within the physical confines of the turbine engine 100. Thus, FIGS. 2A-2D are intended to demonstrate the concepts of operation, and not necessarily a specific implementation, which may be modified based on the power requirements, thrust requirements, turbine engine specific fuel consumption, and material properties of various components.

For example, a fabricator can design the permanent magnet 220 and the armature winding 230 according to FIG. 2A or 2B when radial space along the length of blades of the compressors 170 is more readily available or according to FIG. 2C or 2D when axial space between the compressors 170 is more readily available. Similarly, to optimize the power transfer capabilities of the electrical extractor 111, the resonant emitter 240 may be sized and positioned to overlay the armature winding 230 and/or the permanent magnet 220 so that the resonant emitter 240 extends over the entire length of the electrical extractor 111, and the length and position of the resonant receiver 250 is matched to overlay the resonant emitter 240.

Figure 3:
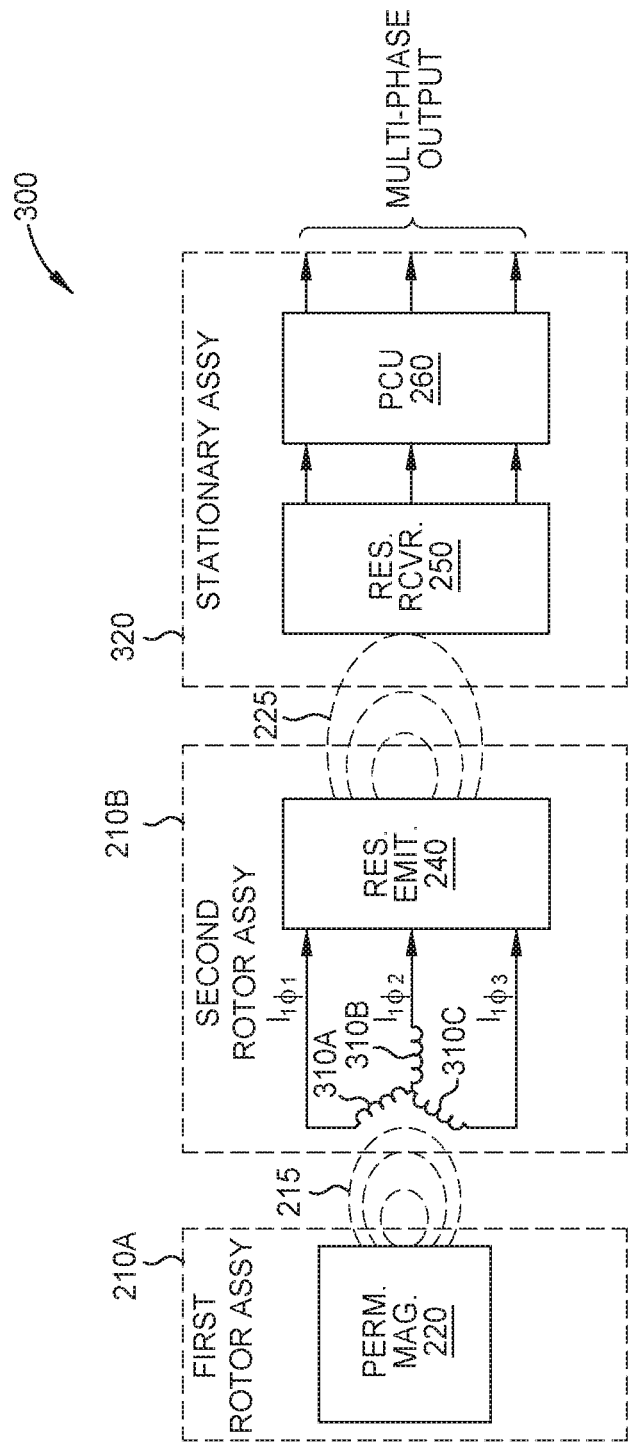
FIG. 3 is a circuit diagram of the electromagnetic components of an electrical generator, according to aspects of the present disclosure.

FIG. 3 is a circuit diagram 300 of the EM components of an electrical generator 110. The first rotor assembly 210A (which includes the permanent magnet 220) is arranged in magnetic contact, but not physical contact, with the second rotor assembly 210B (which includes the armature winding 230 and the resonant emitter 240) via the first magnetic field 215. As used herein, magnetic contact describes the state in which a magnetic field produced by a permanent or electromagnet is of at least a predefined strength between two components. The armature winding 230 includes a plurality of receiving windings 310A-C (generally, receiving winding 310) that each produce one phase of power from the received first magnetic field 215. Although illustrated as providing three-phase current to the resonant emitter 240 via three corresponding receiving windings 310A-C, in other aspects, more or fewer than three phases may be used by, for example, using more or fewer receiving windings.

The first rotor assembly 210A is connected to one compressor 170 of the turbine engine 100, such as shown in FIGS. 2A-2D and the second rotor assembly 210B is connected to a second compressor 170 of the turbine engine 100, such as shown in FIGS. 2A-2D. Due to the difference in rotational speeds of each compressor 170 when the turbine engine 100 is in operation, the first rotor assembly 210A rotates at the differential speed relative to the second rotor assembly 210B.

The second rotor assembly 210B is arranged in magnetic contact, but not physical contact, with a stationary assembly 320 via the resonant emitter 240 and the resonant receiver 250. The stationary assembly 320 is disposed on (or through) the enclosure 120 of the turbine engine 100, and as such, remains stationary relative to the rotating compressors 170 and the EM components connected thereto. The stationary assembly 320 includes the resonant receiver 250 and the power control unit 260, which physically connects the stationary assembly 320 to an electrical bus or other power distribution system for the vehicle. The resonant emitter 240 and resonant receiver 250, which are discussed in greater detail in regard to FIG. 5, respectively generate and receive the second magnetic field 225 as a high-frequency magnetic field at a predefined resonant frequency to produce a power output to the power control unit 260 and the vehicle.

Figure 4:
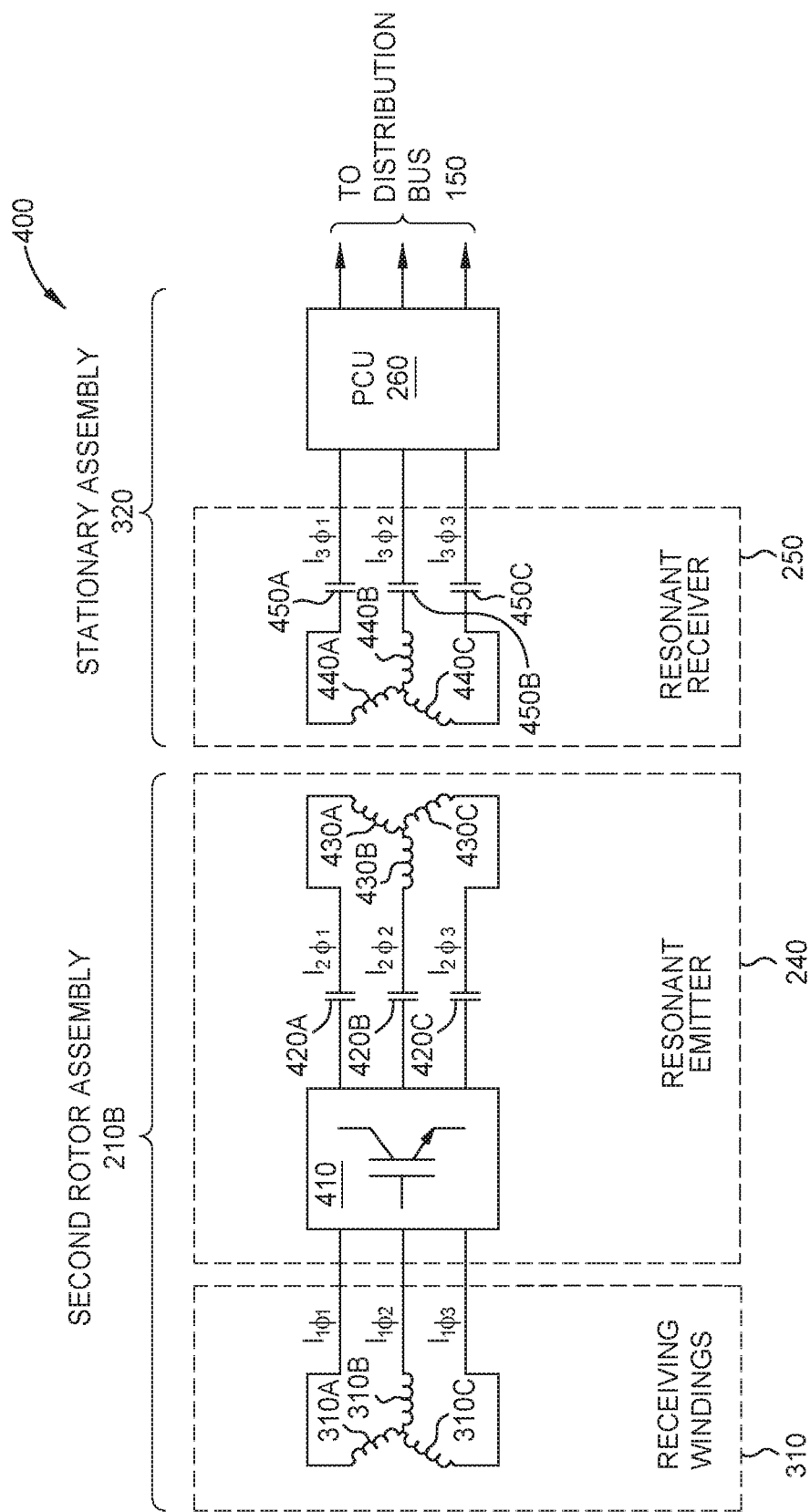
FIG. 4 is a circuit diagram detailing the resonant emitter and resonant receiver, according to aspects of the present disclosure.

FIG. 4 is a circuit diagram 400 detailing a three-phase example of the resonant emitter 240 and resonant receiver 250, according to aspects of the present disclosure. The armature winding 230 includes a plurality of receiving windings 310A-C that each produce one phase of power (e.g., $I_{1\phi 1}$, $I_{1\phi 2}$, $I_{1\phi 3}$) due to the interaction of the armature windings with the received first magnetic field 215. In aspects using more or fewer than three phases of power, a different corresponding number of receiving windings 0310 are used. The power is carried from the receiving windings 310 to a high frequency three-phase converter 410, such as, for example, one or more insulated-gate bipolar transistors (IGBT), Metal oxide semiconductor field effect transistors (MOSFET), or other controlled switching devices, to increase the frequency of the power to generate the second magnetic field 225 at a predefined frequency. The predefined frequency is greater than the difference between the rotational speeds of the compressors 170 to which the resonant emitter 240 and other components of the electrical extractor 111 are connected, and is tuned for power transfer efficiency over the air gap between the resonant emitter 240 and the resonant receiver 250. Emitter capacitors 420A-C (generally, emitter capacitor 420) are disposed on each output from the high frequency converter 410, each of which is connected in series with a phase inductor 430A-C (generally, phase winding 430) to form a LC resonant circuit to generate the second magnetic field 225 at a pre-determined resonant frequency.

Each phase winding 430 receives one phase of high frequency power, and generates one phase of the second magnetic field 225. A corresponding receiver winding 440A-C (generally, receiver winding 440) of the resonant receiver 250, each of which is connected in series with a corresponding receiver capacitor 450A-C (generally, receiver capacitor 450) and forms an LC resonant receiving circuit that receives the second magnetic field 225 at the pre-determined resonant frequency to produce a corresponding phase of power for a second current (e.g., $I_{2\phi1}, I_{2\phi2}, I_{2\phi3}$) from the received second magnetic field 225. Each receiver resonant circuit, inductor or winding 440 and capacitor 450, is connected to the power control unit 260. The power control unit 260 may convert the power from AC to DC (or AC to AC), increase or reduce the number of phases of the power, make or break an electrical connection to the bus, raise or lower a voltage of the power, raise or lower the frequency of the power, and the like to condition the power for consumption or storage by the vehicle.

Although shown in FIG. 4 as an LC (Inductive and Capacitive) circuit in a series arrangement, in other aspects the circuitry of the resonant emitter 240 and resonant receiver 250 may include RLC (Resistive, Inductive, and Capacitive) elements in other arrangements that allow for a resonant magnetic linkage between the resonant emitter 240 and the resonant receiver 250 when the resonant emitter 240 is powered. Other examples include parallel LC circuits, RLC circuits, actively tuned resonant circuits, etc.

Figure 5:
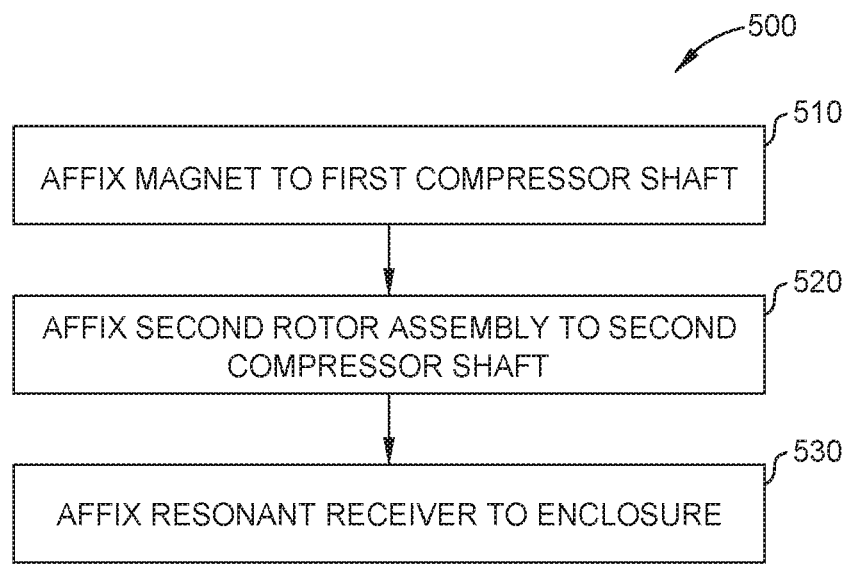
FIG. 5 is a flowchart of a method of construction for an electrical generator, according to aspects of the present disclosure.

FIG. 5 is a flowchart of a method 500 of construction for an electrical generator 110, according to aspects of the present disclosure. Method 500 may be performed during initial assembly of a turbine engine 100, during retrofit or repair of a turbine engine 100, or as a pre-assembly operation for components of a turbine engine 100.

Method 500 begins with block 510, where a fabricator affixes a permanent magnet 220 to a first compressor shaft. In various aspects, the first compressor shaft may be shaft 160 associated with the lower-pressure compressor 170 or the higher-pressure compressor 170 at an interface region between two compressors 170, and the permanent magnet 220 is affixed directly or via a first rotor assembly 210A. In various aspects, block 510 may be repeated to allow a fabricator to affix a secondary permanent magnet 220 to a secondary first compressor shaft (e.g., at a different location on a shaft 160 within the primary electrical generator 110) for use in a secondary electrical generator 110 in a three-shaft turbine engine 100.

At block 520, a fabricator affixes a second rotor assembly 210B, including an armature-emitter assembly, to the second compressor shaft. For example, the fabricator affixes the second rotor assembly 210B to a shaft 160 associated with a lower-pressure compressor 170 when the permanent magnet 220 is affixed to the shaft 160 of the higher-pressure compressor 170, but affixes the second rotor assembly 210B to a shaft 160 associated with a higher-pressure compressor 170 when the permanent magnet 220 is affixed to the shaft 160 associated with the lower-pressure compressor 170. The interface region between the first and second compressors 170 defines an area that is free of fans or blades of the corresponding compressors 170. In various aspects, block 520 may be repeated to allow a fabricator to affix a secondary second rotor assembly 210B to a secondary second compressor shaft (e.g., shaft 160 associated with a third compressor 170C) for use in a secondary electrical generator 110 in a three-shaft turbine engine 100.

The second rotor assembly 210B includes the armature winding 230, and the resonant emitter 240, and spacers. The spacers arrange the armature winding 230 and the resonant emitter 240 to position the armature winding 230 in the first magnetic field 215 and to separate the first magnetic field 215 from the second magnetic field 225 when the compressors 170 rotate relative to one another during operation of the turbine engine 100. The spacers also position the resonant emitter 240 at a set location to interface and magnetically couple with the resonant receiver 250 when the turbine engine 100 is operational.

At block 530, a fabricator affixes a resonant receiver 250 to an interior surface of the enclosure 120 for the turbine engine 100 in relation to the interface region between the two compressors 170 and where the second magnetic field 225 is produced during operation of the turbine engine 100. In various aspects using a three-shaft design, block 530 may be repeated to allow a fabricator to affix a secondary resonant receiver 250 to a secondary location on the interior surface of the enclosure 120, corresponding to the interface region between the two compressors 170 used by the secondary electrical generator 110 and where the secondary second magnetic field 225 is produced during operation of the turbine engine 100. Method 500 may then conclude.

Figure 6:
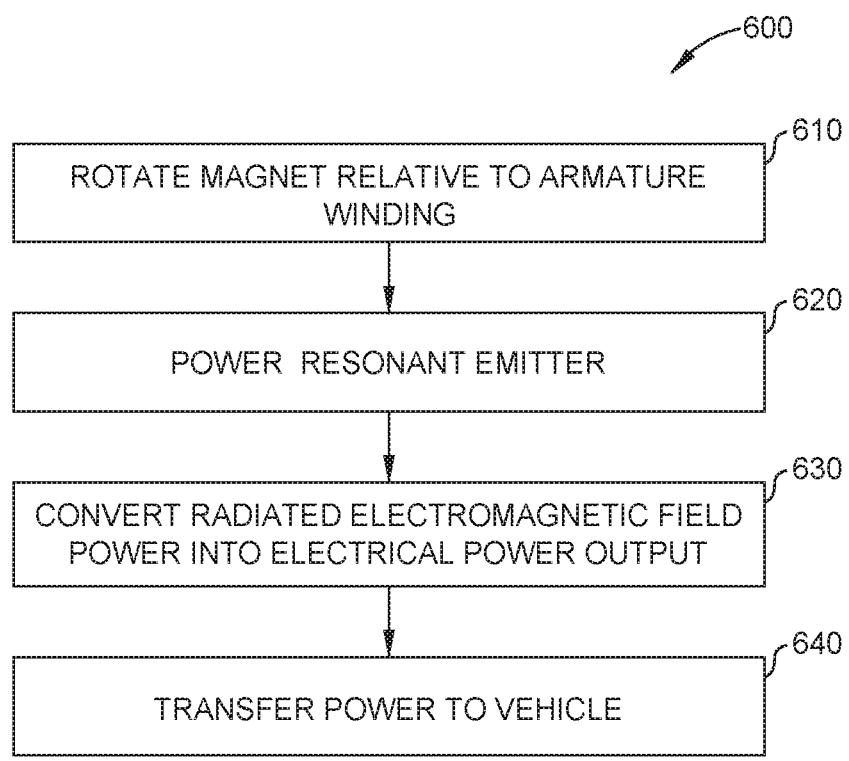
FIG. 6 is a flowchart of a method for extracting electrical energy from a turbine engine, according to aspects of the present disclosure.

FIG. 6 is a flowchart of a method 600 for wirelessly extracting electrical energy from a turbine engine 100, according to aspects of the present disclosure. As will be appreciated, in a three-shaft turbine engine 100, method 600 may be performed twice in parallel—extracting electrical power from the differential rotation of a primary electrical generator 110 and a secondary electrical generator 110 located on the interfaces between different pairs of compressors 170.

Method 600 begins at block 610, where an operator of the turbine engine 100 causes the permanent magnet 220 attached to a first compressor 170A of a turbine engine 100 to rotate relative to a second compressor 170B of the turbine engine 100. The operator may cause the relative rotation by engaging the turbine engine 100 to produce thrust for a vehicle; inducing rotational energy on the compressors 170 by the combustion of fuel in a combustion chamber and expelling the exhaust through a turbine region, thus causing the turbines 180 to rotate the corresponding shafts 160 and thereby rotate the compressors 170. The permanent magnet 220, which may be part of an array of permanent magnets 220 connected to a first compressor 170A and arranged radially around the shafts 160, emits a first magnetic field 215. When rotated, the first magnetic field 215 induces a first current, as a multiphase alternating current (e.g., $I_{1\phi1-3}$), in an armature winding 230 that is connected to a second compressor 170B and also arranged radially around the shafts 160. In various aspects, the armature winding 230 is arranged coaxially with the permanent magnets 220, planetarily with the permanent magnets 220, or alternatingly coaxially and planetarily with the permanent magnet 220 around the shaft 160. Stated differently, the air gap between the permanent magnet 220 and the armature winding 230 through with the first magnetic field 215 propagates may be coaxial to the shafts 160, defined in a plane that intersects the shafts 160, or vary between coaxial or intersecting planes at different locations around the shaft 160.

In various aspects, the "first" compressor 170A may refer to a first one of a high-pressure compressor or a low-pressure compressor in a two-shaft turbine engine 100, and the "second" compressor 170B may refer to the other compressor. Similarly, in a three-shaft turbine engine 100, the "first" compressor 170A may refer to a high-pressure compressor or a low-pressure compressor, in which case the "second" compressor 170B refers to a medium-pressure compressor, or the "first" shaft 170A may refer to the medium-pressure compressor, in which case the "second" shaft 170B may refer to either the high-pressure compressor or the low-pressure compressor. As will be appreciated, the designations of "high-," "medium-," and "low-" pressures are used to refer to different components within the turbine engine 100 based on the relative operational pressures between those components. Accordingly, in a given pair of rotors, one shall be understood to be the higher-pressure rotor and the other to be the lower-pressure rotor.

At block 620, the first current ($I_1$) powers an electromagnet (e.g., a resonant emitter 240) to generate a second magnetic field 225 at or above a predefined frequency. In various aspects, the predefined frequency is tuned to the characteristics of the turbine engine 100, including, but not limited to, the distance between the resonant emitter 240 and the resonant receiver 250, the relative location in space of the second magnetic field 225 to the first magnetic field 215 in the electrical generator 110, the relative location of a primary electrical generator 110 to a secondary electrical generator 110, the rotational speeds of the compressors 170, etc. In various aspects, the predefined frequency is set high (e.g., at least 10 kHz) to thereby reduce losses when wirelessly transferring power via the resonant emitter 240 to the resonant receiver 250.

At block 630, a resonant receiver 250, which is disposed on an inner surface of the enclosure 120, converts the radiated electromagnetic field power (e.g., from the rotating second magnetic field 225) into an electrical power output. In various aspects, the electrical power output is a fourth current ($I_4$) that is provided as a multiphase alternating current (AC) electrical power output, but in other aspects, the electrical output may be single phase and/or direct current (DC), depending on the power consumption characteristics of the vehicle.

At block 640, the resonant receiver 250 transfers the power to an electrical bus for use and/or storage by the vehicle. In various aspects, the resonant receiver 250 transfers the power output to the bus via a power control unit 260, which may condition the power, convert the power from AC to DC (or DC to AC), reduce or increase the number of phases of the power, make or break an electrical connection to the bus, raise or lower a voltage of the power, raise or lower the frequency of the power, and the like.

Method 600 may continue as long the first and second compressors 170 rotate relative to each other.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A system, comprising:
   a permanent magnet that emits a first magnetic field and is disposed on a first rotor assembly of a turbine engine;
   an armature winding connected to a second rotor assembly of the turbine engine such that the armature winding is positioned within the first magnetic field;
   a resonant emitter configured to receive, from the armature winding, an electrical power input to generate a second magnetic field of at least a predefined frequency when the first rotor assembly rotates relative to the second rotor assembly; and
   a resonant receiver disposed on an enclosure of the turbine engine, positioned to receive the second magnetic field and convert the second magnetic field into an electrical power output.

2. The system of claim 1, wherein:
   the first rotor assembly is a higher-pressure rotor,
   the second rotor assembly is a lower-pressure rotor, and
   the higher-pressure rotor rotates at a first speed that is greater than a second speed at which the lower-pressure rotor rotates.

3. The system of claim 1, wherein:
   the first rotor assembly is a lower-pressure rotor,
   the second rotor assembly is a higher-pressure rotor, and
   the higher-pressure rotor rotates at a first speed that is greater than a second speed at which the lower-pressure rotor rotates.

4. The system of claim 1, wherein the first magnetic field propagates radially outward from an axis of rotation for the first rotor assembly over an air gap defined between the permanent magnet and armature winding.

5. The system of claim 1, wherein the first magnetic field propagates coaxially to an axis of rotation for the first rotor assembly over an air gap defined between the permanent magnet and armature winding.

6. The system of claim 1, further comprising:
   a high frequency converter disposed between the armature winding and the resonant emitter; and
   wherein the high frequency converter is configured to provide the electrical power input at a higher frequency to the resonant emitter than the first magnetic field is received by the armature winding.

7. The system of claim 6, wherein the higher frequency is greater than a difference in rotational speed between the first rotor assembly and the second rotor assembly and is based on a power transfer efficiency between the resonant emitter and the resonant receiver.

8. The system of claim 1, wherein the electrical power output includes a plurality of electrical phases based on a number of phases defined in the armature winding.

9. The system of claim 1, further comprising a power control unit disposed in the enclosure and connected to a power distribution bus for a vehicle.

10. A turbine engine, comprising:
    an enclosure, comprising:
      an air intake at an upstream end;
      a compression section downstream of the air intake;
      a combustion section downstream of the compression section;
      a turbine section downstream of the combustion section; and
      an exhaust at a downstream end;
    a first shaft coupled with a first compressor of the compression section and with a first turbine of the turbine section, wherein the first shaft is configured to rotate at a first rotational speed;
    a second shaft coupled with a second compressor of the compression section and with a second turbine of the turbine section and running coaxially with the first shaft, wherein the second shaft is configured to rotate at a second rotational speed;
    an armature winding connected to a first one of the first compressor and the second compressor;
    a permanent magnet connected to a second one of the first compressor and the second compressor, configured to:
      emit a first magnetic field;
      rotate relative to the armature winding at a differential rotational speed corresponding to a difference between the first rotational speed and the second rotational speed; and
      induce a current in the armature winding;
    a resonant emitter connected to the armature winding and configured to generate a second magnetic field of at least a predefined frequency when powered by the current; and
    a resonant receiver disposed on the enclosure of the turbine engine, positioned to receive the second magnetic field, and configured to convert the second magnetic field into an electrical power output.

11. The turbine engine of claim 10, further comprising:
    a third shaft coupled with a third compressor of the compression section downstream of the first compressor and the second compressor and with a third turbine of the turbine section upstream of the first turbine and the second turbine,
    wherein the third shaft extends coaxially to the second shaft and is configured to rotate at a third rotational speed that is greater than the first rotational speed and the second rotational speed.

12. The turbine engine of claim 11, further comprising:
    a secondary armature winding, connected to a first one of the third compressor and the second compressor;
    a secondary permanent magnet, connected to a second one of the third compressor and the second compressor configured to:
      emit a secondary first magnetic field;
      rotate relative to the secondary armature winding at a secondary differential rotational speed corresponding to a secondary difference between the third rotational speed and the second rotational speed; and
      induce a secondary current in the secondary armature winding;
    a secondary resonant emitter connected to the secondary armature winding and configured to generate a secondary second magnetic field of at least a secondary predefined frequency when powered by the secondary current; and
    a secondary resonant receiver disposed on the enclosure of the turbine engine, positioned to receive the secondary second magnetic field, and configured to convert the secondary second magnetic field into a secondary electrical power output.

13. The turbine engine of claim 10, further comprising:
    a third shaft coupled with a third compressor of the compression section upstream of the first compressor and the second compressor and with a third turbine of the turbine section downstream of the first turbine and the second turbine; and
    wherein the third shaft extends coaxially to the second shaft, and is configured to rotate at a third rotational speed that is less than the first rotational speed and the second rotational speed.

14. The turbine engine of claim 13, further comprising:
a secondary armature winding, connected to a first one of the third compressor and the first compressor;
a secondary permanent magnet, connected to a second one of the third compressor and the first compressor, configured to:
   emit a secondary first magnetic field;
   rotate relative to the secondary armature winding at a secondary differential rotational speed corresponding to a secondary difference between the third rotational speed and the first rotational speed; and
   induce a secondary current in the secondary armature winding;
a secondary resonant emitter connected to the secondary armature winding and configured to generate a secondary second magnetic field of at least a secondary predefined frequency when powered by the secondary current; and
a secondary resonant receiver disposed on the enclosure of the turbine engine, positioned to receive the secondary second magnetic field, and configured to convert the secondary second magnetic field into a secondary electrical power output.

15. The turbine engine of claim 10, further comprising:
a nacelle, defining a bypass flow chamber in which the enclosure is disposed; and
a transfer cable, disposed in the bypass flow chamber running from the enclosure to electrically connect the resonant receiver to a power distribution bus for a vehicle.

16. The turbine engine of claim 15, further comprising: a power control unit disposed within the bypass flow chamber externally to the enclosure and electrically connected between the resonant receiver and the transfer cable.

17. The turbine engine of claim 10, wherein the armature winding and the permanent magnet are separated by an air gap defined coaxially to the first shaft.

18. The turbine engine of claim 10, wherein the armature winding and the permanent magnet are separated by an air gap defined in a plane intersecting an axis of rotation of the first shaft.

19. A method, comprising:
rotating a permanent magnet, emitting a first magnetic field and attached to a first rotor assembly of a turbine engine, about a first shaft of the turbine engine to induce a multiphase alternating current in an armature winding disposed on a second rotor assembly attached to a second compressor of the turbine engine connected to a second shaft coaxial with the first shaft;
powering, via the multiphase alternating current, a resonant emitter to generate a second magnetic field at or above a predefined frequency; and
converting the second magnetic field via a resonant receiver disposed on an interior surface of an enclosure of the turbine engine into an electrical power output.

20. A method, comprising:
affixing a permanent magnet to a first rotor assembly connected to a first compressor shaft of a turbine engine;
affixing a second rotor assembly, including an armature winding and a resonant emitter, to a second compressor shaft of the turbine engine, wherein the armature winding is positioned within a first magnetic field emitted by the permanent magnet; and
affixing a resonant receiver to an interior surface of an enclosure of the turbine engine in relation to the resonant emitter to receive a second magnetic field when the resonant emitter radiates the second magnetic field.

* * * * *